United States Patent [19]
Hara et al.

[11] Patent Number: 5,592,239
[45] Date of Patent: Jan. 7, 1997

[54] PROJECTOR DEVICE

[75] Inventors: Nobuyuki Hara; Shigekatsu Tagami, both of Kanagawa, Japan

[73] Assignees: Sony Corporation, Tokyo, Japan; Texas Instruments Corporation, Dallas, Tex.

[21] Appl. No.: 274,476

[22] Filed: Jul. 13, 1994

[30] Foreign Application Priority Data

Jul. 14, 1993 [JP] Japan .................................... 5-197032

[51] Int. Cl.$^6$ ........................................................ H04N 5/74
[52] U.S. Cl. .......................... 348/771; 348/745; 348/747
[58] Field of Search .................................... 348/755–757, 348/764–765, 770, 771, 745–747, 806, 807, 781, 782, 785; 345/85, 108, 109; 359/223, 224, 290, 291, 317; H04N 5/74, 9/31, 3/22, 3/26

[56] References Cited

U.S. PATENT DOCUMENTS

| | | | |
|---|---|---|---|
| 4,680,579 | 7/1987 | Ott .............................................. | 348/771 |
| 4,868,668 | 9/1989 | Tavernetti ................................... | 348/745 |
| 4,999,703 | 3/1991 | Henderson. | |
| 5,170,250 | 12/1992 | Ledebuhr .................................... | 348/745 |
| 5,341,176 | 8/1994 | Baba ........................................... | 348/745 |
| 5,386,253 | 1/1995 | Fielding ...................................... | 348/745 |

FOREIGN PATENT DOCUMENTS

| | | | |
|---|---|---|---|
| 61-79781 | 9/1985 | Japan .................................. | G09F 9/30 |
| 0340693 | 2/1991 | Japan .................................. | H04N 13/04 |
| 3174112 | 7/1991 | Japan .................................. | H04N 5/74 |
| WO93/15588 | 8/1993 | WIPO. | |

*Primary Examiner*—Michael H. Lee
*Attorney, Agent, or Firm*—William S. Frommer; Alvin Sinderbrand

[57] ABSTRACT

A projector device, which is simple and small and able to display images brighter and also able to improve the usefulness considerably. The effective reflecting lights of the mirror deflection type light modulators are focused into images at the position right in front of the projection lens, and the effective reflection lights are partly turned and focused on the two-dimensional position detector means for detecting the vertical and horizontal positions of the formed images. Then, based on the detected information from the two-dimensional position detector means, the mirror deflection type light modulators are finely displaced in the vertical and horizontal directions, or the mirror deflection type light modulators are finely displaced in the vertical direction and the synthesizing mirror means is finely displaced in the direction of focal length, so that the positions of the effective reflection lights of at least two mirror deflection type light modulators are adjusted, therefore the discrepancy of the positions among the colors can be effectively corrected and the image quality can be considerably improved.

4 Claims, 9 Drawing Sheets

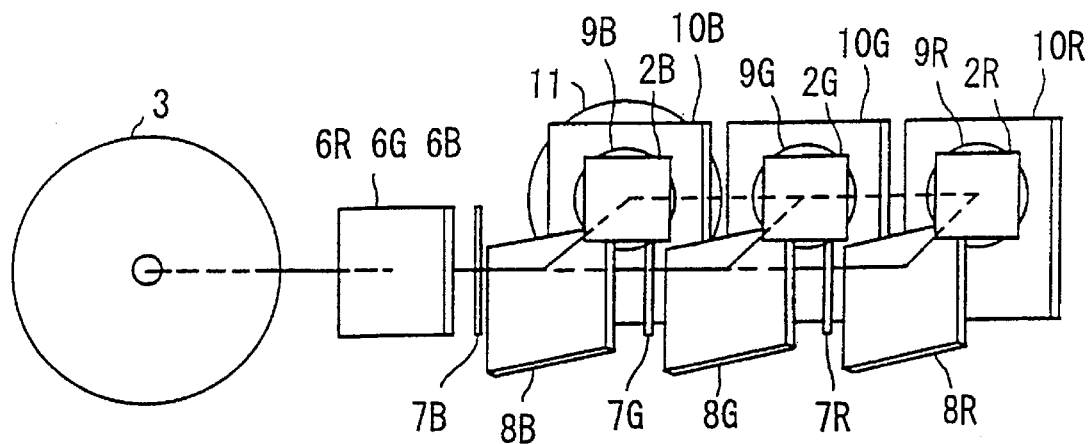
FIG. 3
PRIOR ART
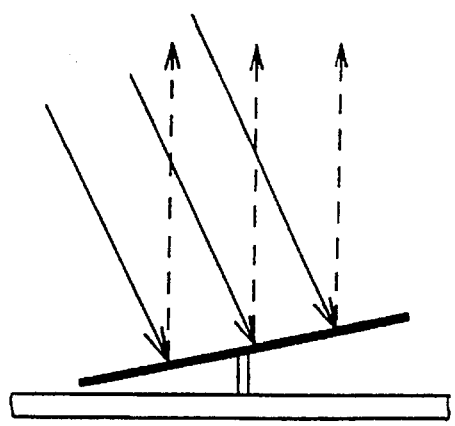 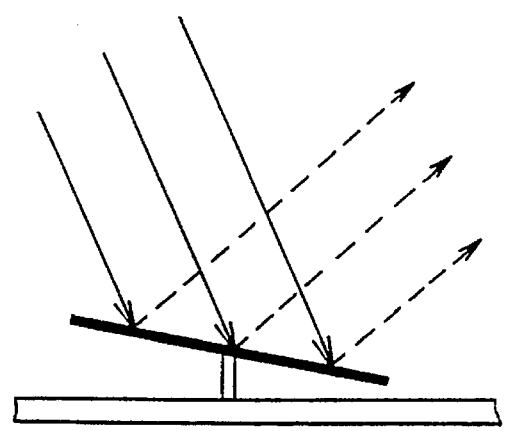
FIG. 4A
PRIOR ART
FIG. 4B
PRIOR ART

PROJECTOR DEVICE

BACKGROUND OF THE INVENTION

1. Field of the Invention

This invention relates to a projector device, and more particularly, to an improvement of project device for projecting color images.

2. Description of the Related Art

Heretofore, there is such projector device that displays a red component, a green component, and a blue component of the image data on three CRTs (cathode-ray tube) separately. On the front of this projection type three-tube projector device, three CRTs are disposed. On the side where image projection surfaces of CRTs reside, a red filter, a green filter, and a blue filter are disposed sequentially and respectively along with their projection lenses.

On projecting, CRTs separately project a red component, a green component, and a blue component of the image data, directly on the screen. A projected light of a red component, a projected light of a green component, and a projected light of a blue component which are emitted by respective CRTs are synthesized to form a single image, so that a color image is displayed as a whole.

Other than the projection type three-tube projector device, there exists a reflection type three-tube projector device which comprises three CRTs in its box. In the case of this type of projector device, an optical path similar to that of a projection type three-tube projector device is reflected and turned by a mirror which is placed inside the box, and the projected light is thrown on a semitransparent screen in the form of a frosted glass, from the back side of the screen.

Hereby projected lights of red, green, and blue components thrown by respective CRTs are synthesized on the screen to form a single image, so that a color image is displayed as a whole. In the case of the reflection type three-tube projector device, the optical path is reflected to miniaturize the device and a screen itself is unified, so that a projector device smaller than a projection type three-tube projector device can be attained, and usage by users can be facilitated.

However, as to a projection type three-tube projector device and a reflection type three-tube projector device both having the above mentioned constitution, owing to the fact that CRTs are utilized as the light source and that the images emitted by those CRTs are enlarged on the display screen, there are problems that the whole device unavoidably becomes to a large size, and it is difficult to increase the brightness of the displayed images.

To solve these problems a projector device has been proposed, in which three liquid-crystal panel boards are used as an image source in place of CRTs, and a red component, a green component, and a blue component are separately displayed on each of the liquid-crystal panel boards, while lights are applied to one side of the liquid-crystal panel boards, and the resulted transmitted lights are separately passed through a red filter, a green filter, and a blue filter, and then focused into an image on the screen.

In case of the liquid-crystal projector device, by using the liquid-crystal panel boards, the whole size of the device can be substantially miniaturized than that of a device using CRTs. However, since a liquid-crystal panel board itself has a poor light transmission factor, this device is practically insufficient in terms of the brightness of the displayed images.

Meanwhile, a display system which uses a mirror deflection type light modulator (hereinafter referred to as a "mirror light bulb"), in which microscopic mirror elements are arranged so as to form a plane, according to the arrangement of the pixels, has been proposed (Japanese Patent Application Laid Open No. 179781/1985, No. 40693/1991 and No. 174112/1991).

It is considered that if a projector device for projecting enlarged color images can be formed utilizing this mirror light bulb as an image source, the constitution of the whole device can be simplified and miniaturized to a scale similar to a liquid-crystal projector device, and the brightness of the displayed images can be remarkably increased because the utilization ratio of the light source of the device can be improved as compared with a liquid-crystal.

SUMMARY OF THE INVENTION

In view of the foregoing, an object of this invention is to provide a small-size simple projector device which has increasedly bright display images and is increasedly useful.

The foregoing object and other objects of this invention have been achieved by the provision of a projector device 40 for displaying desired images on an image displaying surface, by projecting illuminating lights on at least two mirror deflection type light modulators 2 (2R, 2G, 2B) having a plurality of microscopic mirror elements disposed according to the pixels of the image data, modulating the mirror deflection type light modulators 2 with the image data of at least two colors respectively, and synthesizing the effective reflecting lights of the mirror deflection type light modulators 2 corresponding to the respective image data; the projector device comprising: relay lens means 9 (9R, 9G, 9B) for focusing the effective reflection lights of the mirror deflection type light modulators 2 into images which are smaller than the aperture of the projection lens 11, on the right-in-front position A of the projection lens 11; mirror means 41 for reflecting and turning the effective reflection lights partly, the mirror means 41 being disposed right-in-front of the focusing position A of the relay lens means 9; two-dimensional position detecting means 42 which detects the vertical and horizontal position of the formed image that the effective reflecting light reflected and turned by the mirror means 41 focuses on; mirror deflection type light modulator adjusting means 58, 60 for finely displacing the mirror deflection type light modulators 2 in the vertical and horizontal directions; and control means 70 for controlling the mirror deflection type light modulator adjusting means 58, 60 in accordance with the detected output from the two-dimensional position detecting means 42 so as to finely displace the mirror deflection type light modulators 2; thereby the positions of the effective reflection lights of at least two mirror deflection type light modulators 2 are adjusted under the controlling of the control means 70.

Also, according to this invention, in a projector device 40 for displaying desired images on a image displaying surface, by projecting illuminating lights on at least two mirror deflection type light modulators 2 (2R, 2G, 2B) having a plurality of microscopic mirror elements disposed according to the pixels of the image data, modulating the mirror deflection type light modulators 2 with the image data of at least two colors respectively, and synthesizing the effective reflecting lights of the mirror deflection type light modulators 2 corresponding to the respective image data; the projector device comprises the following: relay lens means 9 (9R, 9G, 9B) for focusing the effective reflection lights of the mirror deflection type light modulators 2 into images which are smaller than the aperture of the projection lens 11, on the right-in-front of the focusing position A of the projection lens 11; mirror means 41 which reflects and turns the effective reflection lights partly, and which is disposed right in front of the focusing position A of the relay lens means 9; two-dimensional position detecting means 42 which detects the vertical and horizontal position of the formed image that the effective reflecting light reflected and turned by the mirror means 41 focuses on; mirror deflection type light modulator adjusting means 58 for finely displacing the mirror deflection type light modulators 2 in vertical direction; synthesizing mirror adjusting means 67 for finely displacing synthesizing mirror means 10 (10R, 10G, 10B) which synthesize the effective reflection lights, in the direction of focal length; and control means 70 for controlling the mirror deflection type light modulator adjusting means 58 and/or the synthesizing mirror adjusting means 67 in accordance with the detected output from the two-dimensional position detecting means 42, so as to finely displace the mirror deflection type light modulators 2 and/or the synthesizing mirrors 10; thereby the positions of the effective reflection lights of at least two mirror deflection type light modulators 2 are adjusted under the control of the control means 70.

The effective reflecting lights of the mirror deflection type light modulators 2 are focused into images at the right-in-front position A of the projection lens 11. At the same time, a part of each of the effective reflection lights is reflected and focused on the two-dimensional position detector means 42 for detecting the vertical and horizontal positions of the formed images, and then, based on the detected information of the two-dimensional position detector means 42, the mirror deflection type light modulators 2 are finely displaced in the vertical and horizontal directions, or the mirror deflection type light modulators 2 are finely displaced in the vertical direction and the synthesizing mirror means 10 are finely displaced in the direction of focal length, so that the positions of the effective reflection lights from at least two mirror deflection type light modulators 2 can be adjusted, therefore a discrepancy among the positions of colors can be effectively corrected and the image quality can be considerably improved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a schematic rear view explaining the optical system of the projector device shown in FIG. 1;

FIGS. 4A and 4B are schematic diagrams explaining the motion of the mirror element of the mirror deflection type light modulator;

DETAILED DESCRIPTION OF THE EMBODIMENT

Preferred embodiments of this invention will be described with reference to the accompanying drawings:

(1) General Constitution of the Projector Device

Figure 1:
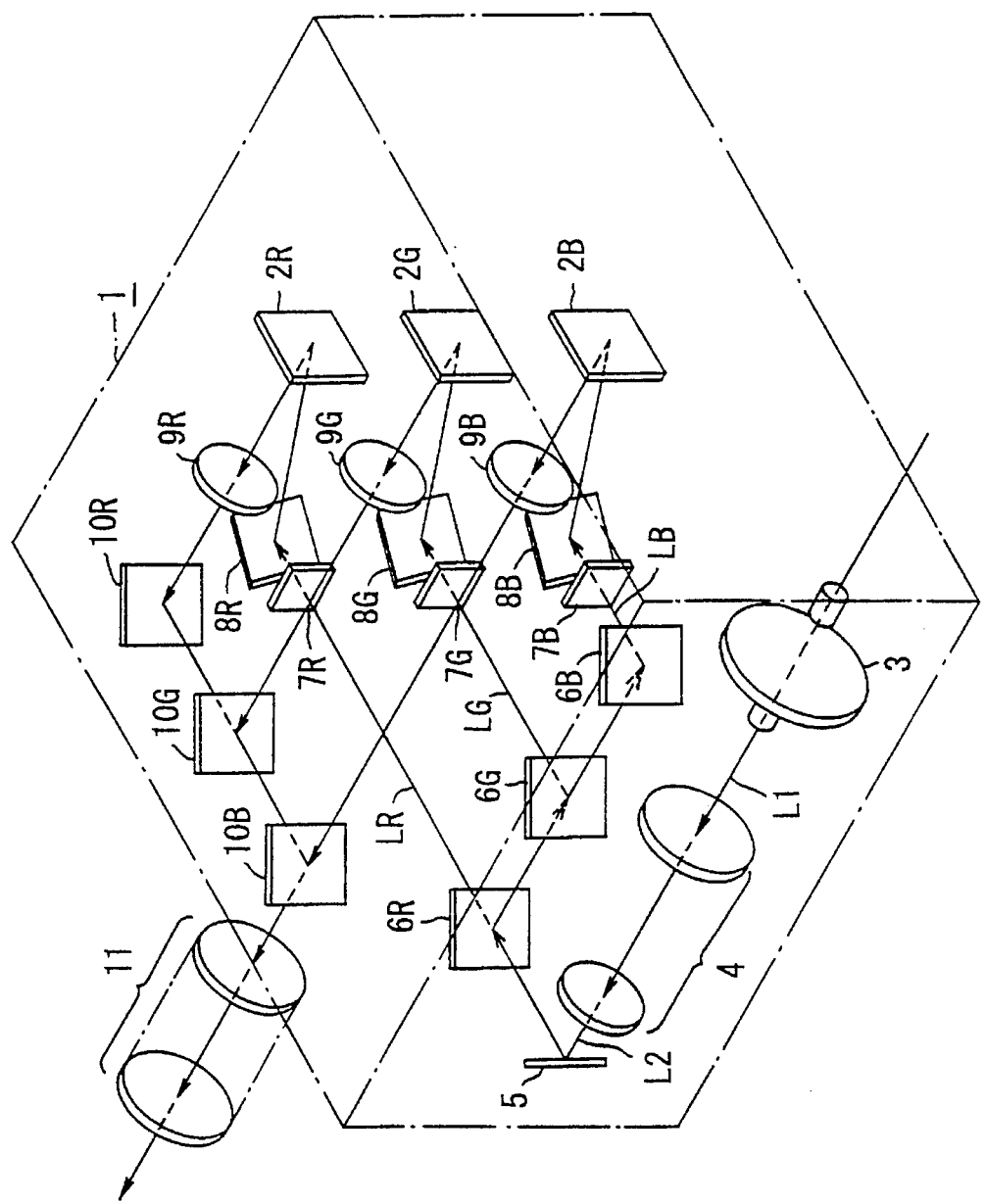
FIG. 1 is a schematic perspective view showing the general constitution of a projector device using mirror deflection type light modulators.
Figure 2:
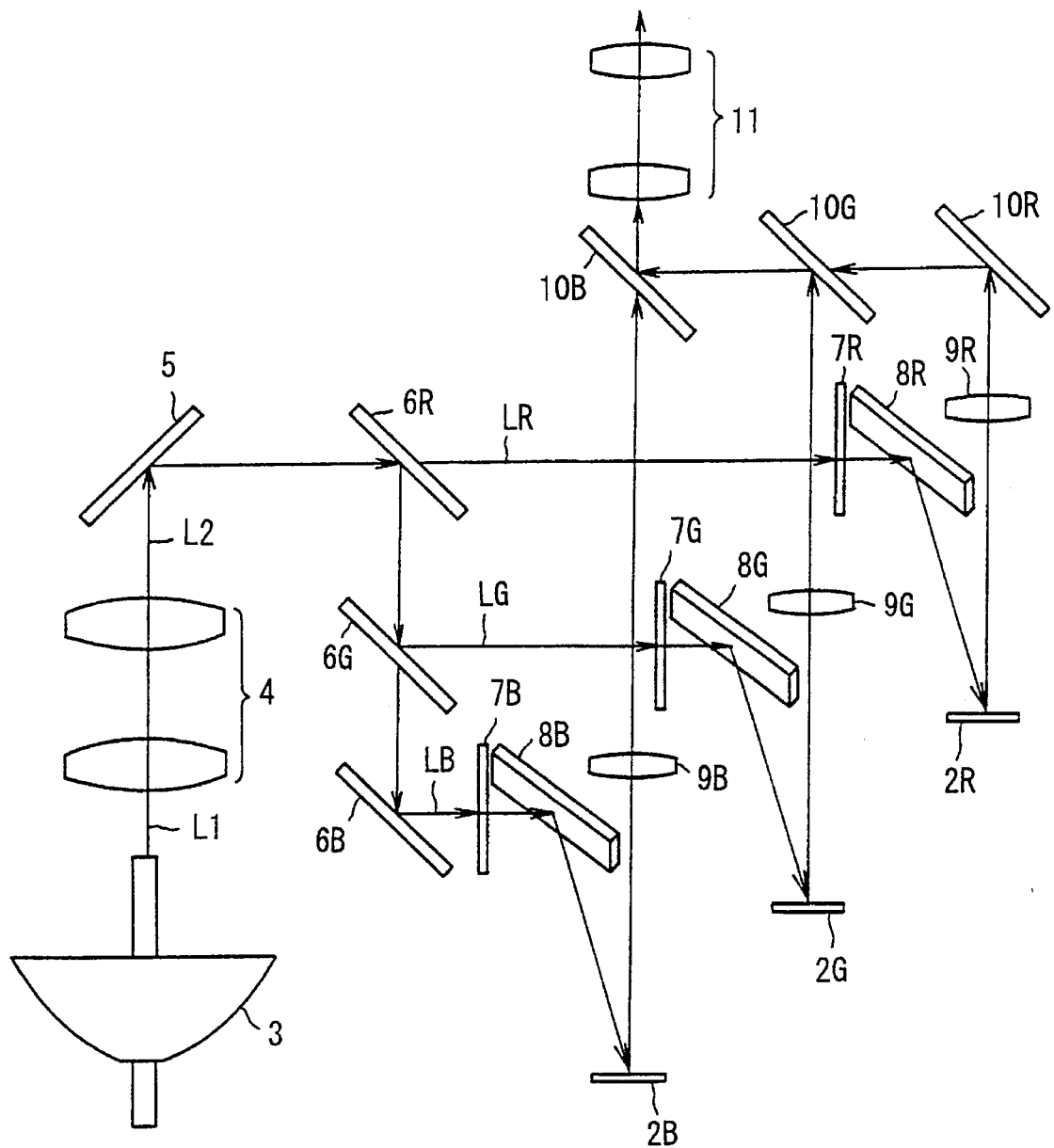
FIG. 2 is a schematic plan view explaining the optical system of the projector device shown in FIG. 1.

Referring to FIG. 1, 1 generally denotes the projector device utilizing three mirror light bulbs 2R, 2G, 2B which correspond to the respective image data of red, green, and blue. In fact, as shown in FIGS. 2 and 3 which have the same numerical numbers on the parts corresponding to FIG. 1, the projection light L1 emitted from the high-intensity white light source 3 is subjected to the removal of unnecessary ultraviolet light by an ultraviolet filter (not shown). The projection light L1 is transformed to a parallel light through a condenser lens 4 and is reflected and turned by the first reflection mirror 5, and then incidents to the separation dichroic mirrors 6R, 6G, and 6B.

The separation dichroic mirrors 6R, 6G, and 6B separate the projection light L2 which is comprised of white light into a red light LR, a green light LG, and a blue light LB. The red, green, and blue lights LR, LG and LB are passed through the beam shaping cylindrical lenses 7R, 7G, and 7B respectively, and are obliquely upwardly reflected and turned by the second reflection mirrors 8R, 8G, and 8B respectively, and then thrown on the reflecting surfaces of the mirror light bulbs 2R, 2G, and 2B respectively.

The mirror light bulbs 2R, 2G, and 2B are composed of a plurality of microscopic mirror elements of the size, for instance, about 17 [μm] square arranged according to the arrangement of pixels of the image data (for instance 768× 576 pixels). Hereby the reflecting surface is formed having approximately the same size as a ½ inch CCD (solid state image sensing device). The microscopic mirror elements are arranged according to each memory cell of the frame memory which correspond to the arrangement of pixels of the image data. The inclination state of each microscopic mirror element separately changes according to the state of corresponding memory cell.

In fact, when the memory cell is in the ON state, that is valid as a pixel, the corresponding microscopic mirror element inclines by +10° from the neutral state as shown in FIG. 4A, meanwhile, when the memory cell is in the OFF state, that is invalid as a pixel, the corresponding mirror element inclines by −10° from the neutral state as shown in FIG. 4B. Hereby, the difference between the path of the effective reflection light which is required to form an image and the path of the ineffective reflection light which is invalid becomes to 20°.

In the case of this projector device 1, the red image data, the green image data, and the blue image data each for one frame are set in their corresponding frame memories which are corresponding to the mirror light bulbs 2R, 2G, and 2B, thus the red image light, the green image light, and the blue image light are formed as the effective reflection lights. These image lights are passed through their corresponding relay lenses 9R, 9G, and 9B, and led to the synthesizing dichroic mirrors 10R, 10G, and 10B, and hence synthesized to form a color image light. This color image light is passed through the projection lens 11 which is constituted as a zoom lens, and is projected on a screen (not shown) which is placed outside of the projector device 1 apart, as an enlarged image.

In the case of this projection device 1, the optical axes of the optical system of the projection light L1, L2 which reaches to the second reflection mirrors 8R, 8G, and 8B via the high-intensity white light source 3, the condenser lens 4, the first reflection mirror 5, the separation dichroic mirrors 6R, 6G, and 6B and the cylindrical lenses 7R, 7G, and 7B and the optic axes of the effective reflection lights which are reflected by the mirror light bulbs 2R, 2G, and 2B and then come to the relay lenses 9R, 9G, and 9B, the synthesizing dichroic mirrors 10R, 10G, and 10B and the projection lens 11 are shifted by the predetermined height, so that it can be prevented from the occurrence of interference among the projection light, the effective reflection light, and the ineffective reflection light.

Furthermore, in the case of this projector device 1, since the configurations of the beams of the projection light are shaped by the cylindrical lenses 7R, 7G, and 7B, in spite of the fact that the beams are obliquely upwardly reflected by the second reflection mirrors 8R, 8G, and 8B, the beams can illuminate the reflecting surfaces of the mirror light bulbs 2R, 2G, and 2B with uniform illuminances.

Figure 5:
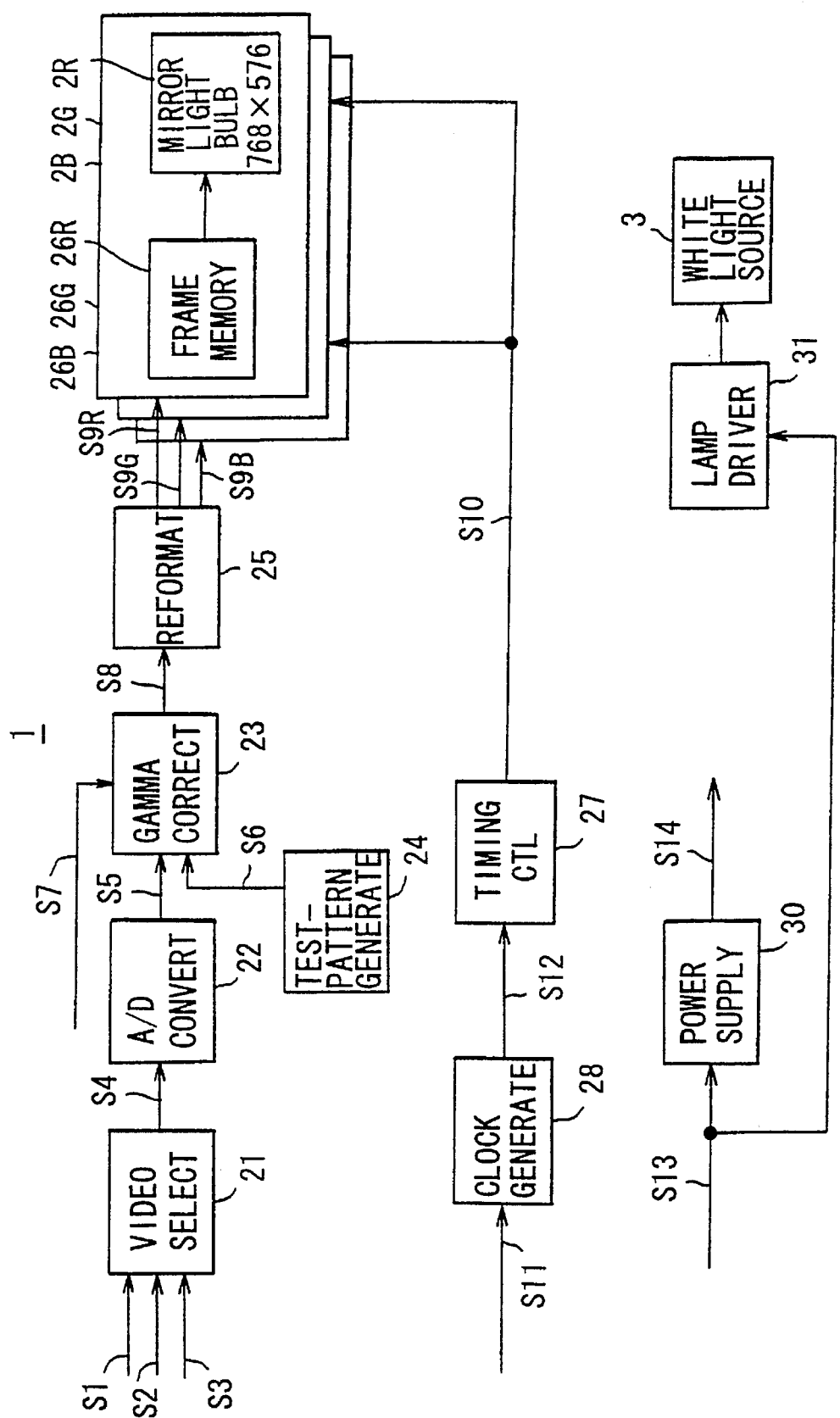
FIG. 5 is a block diagram showing the circuit structure of the projector device shown in FIG. 1.

In the projector device 1, the circuit unit shown in FIG. 5 is arranged under the optical unit which has been described with reference to FIGS. 1 to 3, the FIG. 5 has the same reference numerals on the parts corresponding to FIG. 1. On the projector device 1, a video signal S1 which is inputted from a video equipment in the form of RGB signals, a video signal S2 which is sent from a personal computer, etc. according to VGA (video graphics array), and a video signal S3 of VGA pattern can be selected, as a video signal displayed.

These video signals S1, S2, and S3 are inputted to the video selecting circuit 21 to be selected, the resulted video signal S4 is then converted into the digital video signal S5 in the analog-to-digital converting circuit 22, and the signal S5 is inputted to the gamma correcting circuit 23. The test pattern signal S6 which is generated in the test pattern generating circuit 24 is inputted to the gamma correcting circuit 23, as occasion requires. The gamma correcting circuit 23 gamma corrects the digital video signal S5 or the test pattern signal S6 according to the set gamma correcting parameter S7, and then sends the resulted digital video signal S8 to the reformatting circuit 25.

The reformatting circuit 25 reformats the digital video signal S8 in accordance with the arrangement of the mirror elements of the mirror light bulbs 2R, 2G, and 2B which are comprised of, for instance, 768 pixels×576 lines, where the digital video signal S8 corresponds to the video signal S1 inputted in the form of RGB signals, or to the video signals S2 or S3 of VGA. The resulted digital video signals S9R of the red component, S9G of the green component and S9B of the blue component are sent to the corresponding frame memories 26R, 26G, and 26B.

The frame memories 26R, 26G, and 26B correspond to the mirror light bulbs 2R, 2G, and 2B respectively, and the contents of the frame memories 26R, 26G, and 26B for each frame are sequentially transferred into the mirror light bulbs 2R, 2G, and 2B according to the control signal S10 inputted from the timing control circuit 27, so that the red, the green, and the blue image lights are formed respectively as the effective reflection lights.

The timing control circuit 27 of the projector device 1 generates the control signal S10 for controlling the frame memories 26R, 26G, and 26B and the mirror light bulbs 2R, 2G, and 2B, using the system clock S12. The system clock S12 is generated in the clock generating circuit 28, according to the phase control signal S11 which is based on the inputted video signals S1 to S3.

When the power source switch (not shown) of the projector device 1 is turned on, the alternating current power S13 is supplied to the electric power supplying circuit 30 and the lamp driving circuit 31. The electric power supplying circuit 30 supplies the predetermined direct current power S14 to each part of the circuit unit and to cause the projector device 1 to start its operation. Meanwhile, the lamp driving circuit 31 drives the high-intensity white light source 3, thereby causing the white light source 3 to emit the projection light L1.

In the constitution to the projector device 1, the mirror light bulbs 2R, 2G, and 2B corresponding to red, green, and blue respectively are used as the image sources, the mirror light bulbs 2R, 2G, and 2B are driven by the red, the green, and the blue video signals respectively and illuminated by the red, the green, and the blue projection lights respectively, and the red, green and blue projection lights are made by color separation of a white light. The resulted effective reflection lights of each of the colors are synthesized, and then displayed on a plane as an enlarged image. Therefore, the projector device 1 which is small, light-weight and simple in comparison with a conventional projector device using CRTs can be realized.

The utilization ratio of the projection light of the projector device can be considerably improved because the projection light is reflected by the mirror light bulbs 2R, 2G, and 2B, therefore, a projector device which is small and light-weight and capable of display brighter images can be realized.

(2) The Projector Device of the First Embodiment

Figure 6:
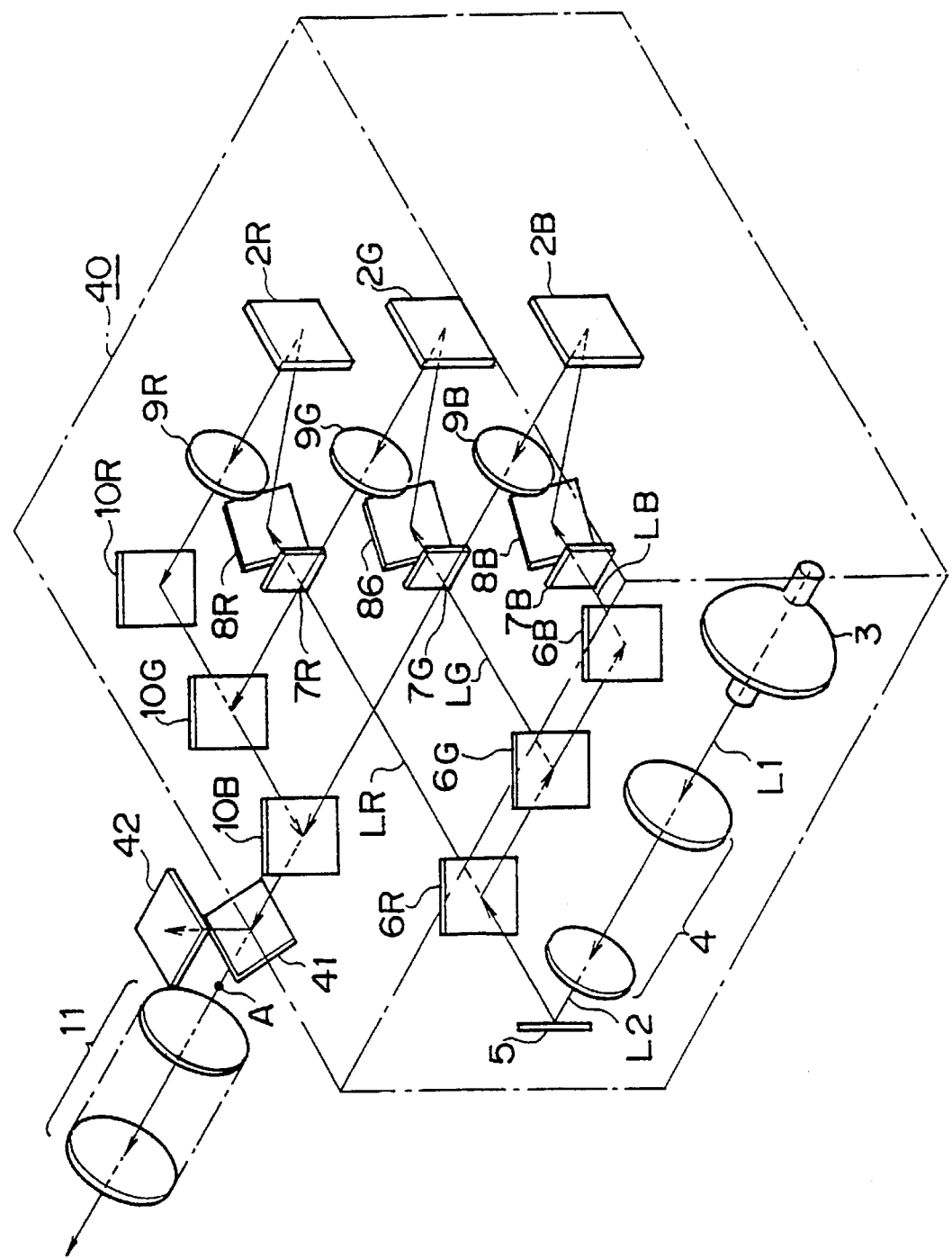
FIG. 6 is a schematic perspective view showing the constitution of the projector device of the embodiment.

As shown in FIG. 6 which has the numerical numbers as FIG. 1 on the corresponding parts, in the case of the projector device 40 of the embodiment, the effective reflected lights reflected by the respective mirror light bulbs 2R, 2G, and 2B are adapted to form the focused images of duplicated size, on the virtual imaging point A which resides in the space right in front of the projection lens 11, by the respective relay lenses 9R, 9G, and 9B. The scale factors of the relay lenses 9R, 9G, and 9B are selected so that the sizes of the formed images at the virtual imaging point A become smaller than the aperture of the projection lens 11.

The effective reflected light is partly reflected and turned by the half mirror 41 which is disposed in the position right in front of the virtual imaging point A, and focused on the two-dimensional position detector 42 which is disposed at the same distance as the virtual imaging point A. The two-dimensional position detector 42 provides the test pattern for the red, the green, and the blue mirror light bulbs 2R, 2G, and 2B respectively, and switches these signals so as to read the positions of the red, the green, and the blue images.

By driving the adjusting motors which are attached to the mounting block for the mirror light bulbs 2R, 2G, and 2B and to the mounting block for the synthesizing dichroic mirrors 10R, 10G, and 10B respectively according to the detected information given by the two-dimensional position detector 42, so as to finely displace the mirror light bulbs 2R, 2G, and 2B and the synthesizing dichroic mirrors 10R, 10G, and 10B in the vertical direction, the rotational direction, and the focus direction, the image positions of red, green, and blue can be corrected respectively.

Figure 7:
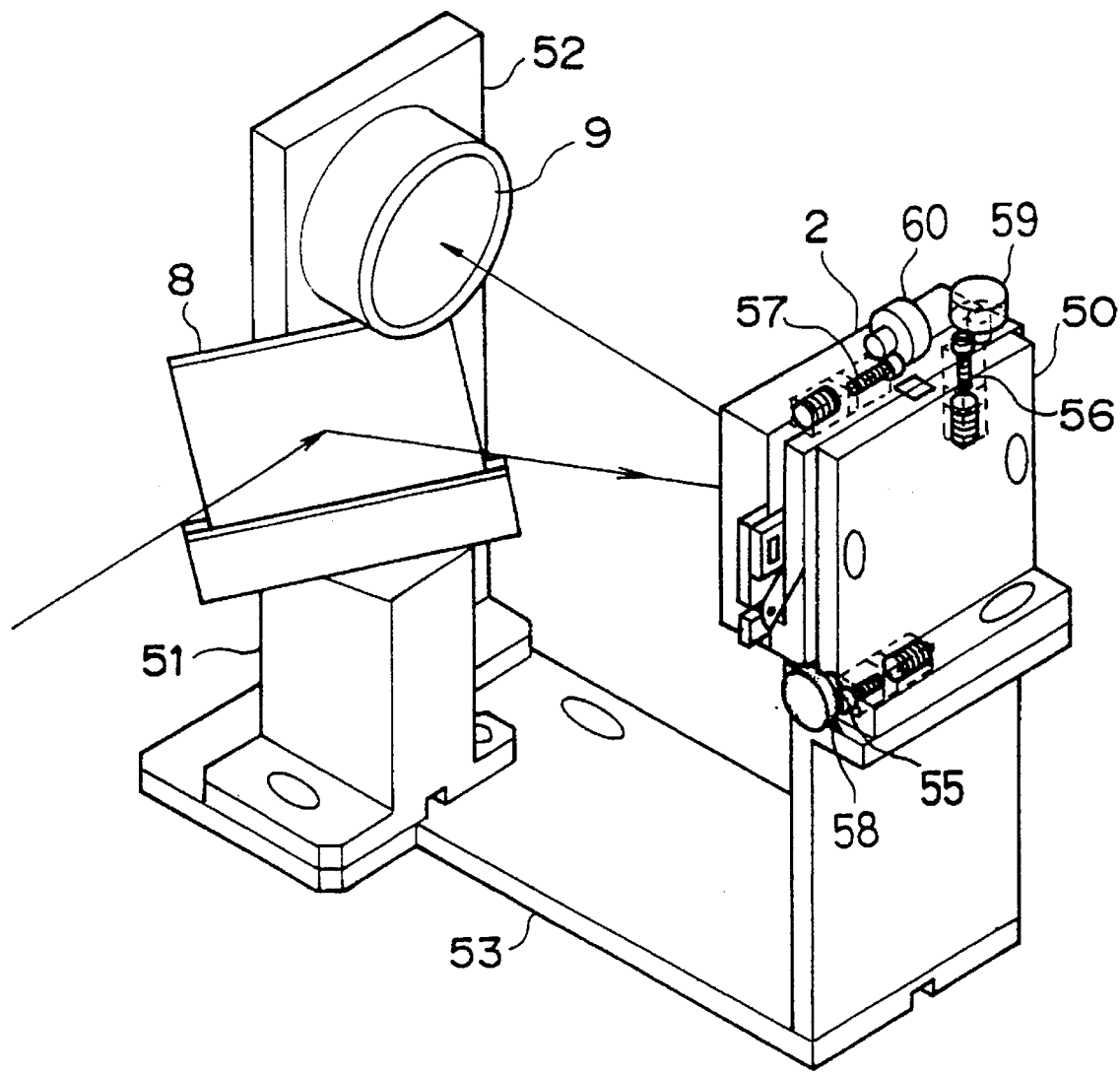
FIG. 7 is a schematic perspective view showing the mounting block for the mirror light bulb.

As shown in FIG. 7, the mounting block 50 for the mirror light bulb 2 (2R, 2G and 2B) are arranged on the base 53, which is arranged so as to be capable of being adjusted in the direction of the optical axis of the relay lens 9, with the mirror holder 51 for the second reflecting mirror 8 (8R, 8G and 8B), and the lens holder 52 for the relay lens 9 (9R, 9G and 9B). The mounting block 50 comprises a sliding mechanism and a rotating mechanism, and also comprises the image position adjusting screws, that is the horizontal adjusting screw 55 for horizontal direction, the vertical adjusting screw 56 for vertical direction, and the rotational adjusting screw 57 for rotational direction.

The horizontal adjusting pulse motor 58, the vertical adjusting pulse motor 59, and the rotational adjusting pulse motor 60 are arranged on the positions which correspond to the positions of the horizontal adjusting screw 55, the vertical adjusting screw 56, and the rotational adjusting screw 57 respectively, so as to be mated with screws 55, 56, and 57 respectively. By driving the pulse motors 58, 59, and 60, the mirror light bulb 2 can be finely displaced so that the image can be adjusted in the horizontal, vertical, and rotational directions.

In practice, when adjusting the position of the image, at least only two pixels of different positions which resides on one of the mirror light bulbs 2R, 2G, and 2B are sequentially turned on as a test pattern, and a pattern such that the pixels on the three mirror light bulbs 2R, 2G, and 2B for red, green and blue are sequentially turned on is used, and it is controlled in such a manner that the pixels on two or more mirror light bulbs 2R, 2G, and 2B are not turned on simultaneously.

Figure 8:
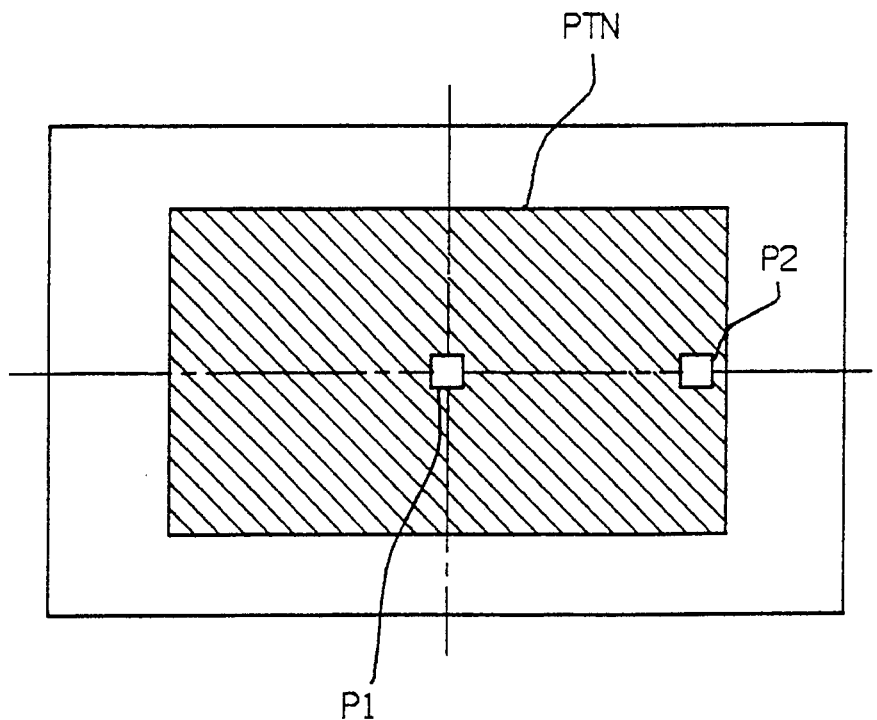
FIG. 8 is a schematic diagram explaining the test pattern for picture position adjustment.

The test pattern for one of the mirror light bulbs 2R, 2G, and 2B is arranged so as to turn on only two pixels P1 and P2 of different positions, as shown in FIG. 8. In practice, on the mirror light bulbs 2R, 2G, and 2B, the pixel P1 which resides at the center of the image displaying screen and the pixel P2 which resides at a predetermined horizontal distance from the pixel P1 are turned on.

Figure 9:
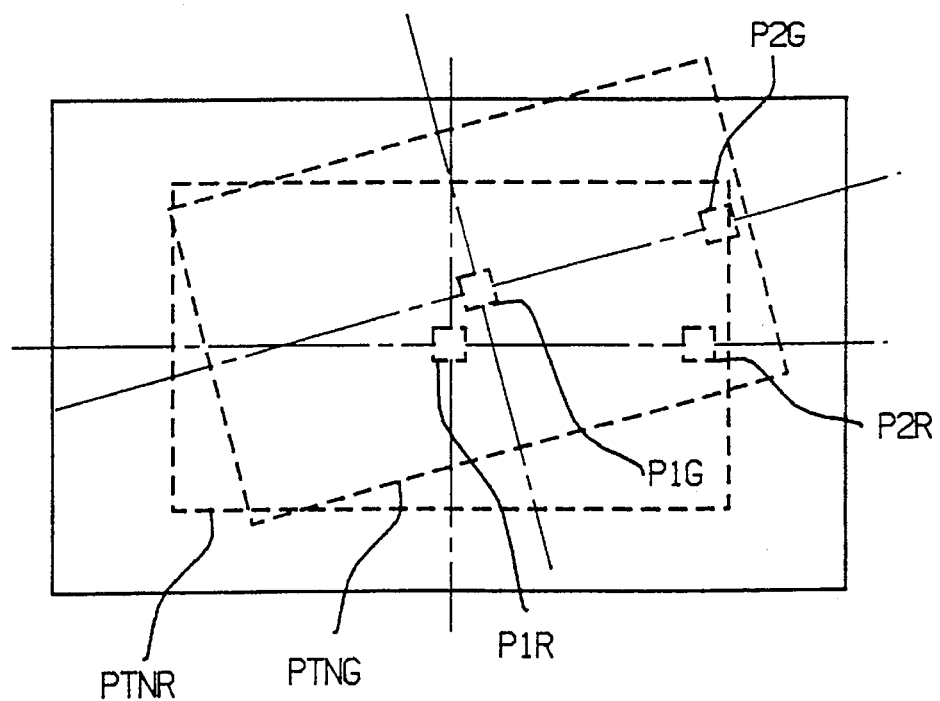
FIG. 9 is a schematic diagram explaining the principle of the detecting of the discrepancy among pictures which utilizes the test pattern of FIG. 8.

For example, in the case where a discrepancy of the position of the green picture based on the position of the red picture is to be detected, the test pattern PTN shown in FIG. 8 develops the images shown in FIG. 9 on the two-dimensional position detector 42. The images P1R and P2R represent the images which are developed by turning on of the pixels P1 and P2 corresponding to the test pattern PTN on the red mirror light bulb 2R, and the images P1G and P2G represent the images which are developed by turning on of the pixels P1 and P2 corresponding to the test pattern PTN on the green mirror light bulb 2G.

Denoting the two-dimensional positions comprised of the horizontal position and the vertical position, of the images P1R and P2R, of the red pixels which are detected by the two-dimensional position detector 42 by $(X_{R1}, Y_{R1})$ and $(X_{R2}, Y_{R2})$ respectively, and the two-dimensional positions of the images P1R and P2R, of the green pixels by $(X_{G1}, Y_{G1})$ and $(X_{G2}, Y_{G2})$ respectively. The horizontal discrepancy $\Delta H_{2G-R}$, the vertical discrepancy $\Delta_{G-R}$, and the rotational discrepancy $\Delta\theta_{G-R}$ of the position of the green picture based on the position of the red picture at this moment can be represented by the following equation:

$$\Delta H_{R-G} = X_{G1} - X_{R1}$$

$$\Delta V_{R-G} = Y_{G1} - Y_{R1}$$

$$\Delta\theta_{R-G} = \tan^{-1}\frac{X_{G2}-X_{G1}}{Y_{G2}-Y_{G1}} \approx \frac{X_{G2}-X_{G1}}{Y_{G2}-Y_{G1}} \quad (\theta \approx 0) \quad (1)$$

Figure 10:
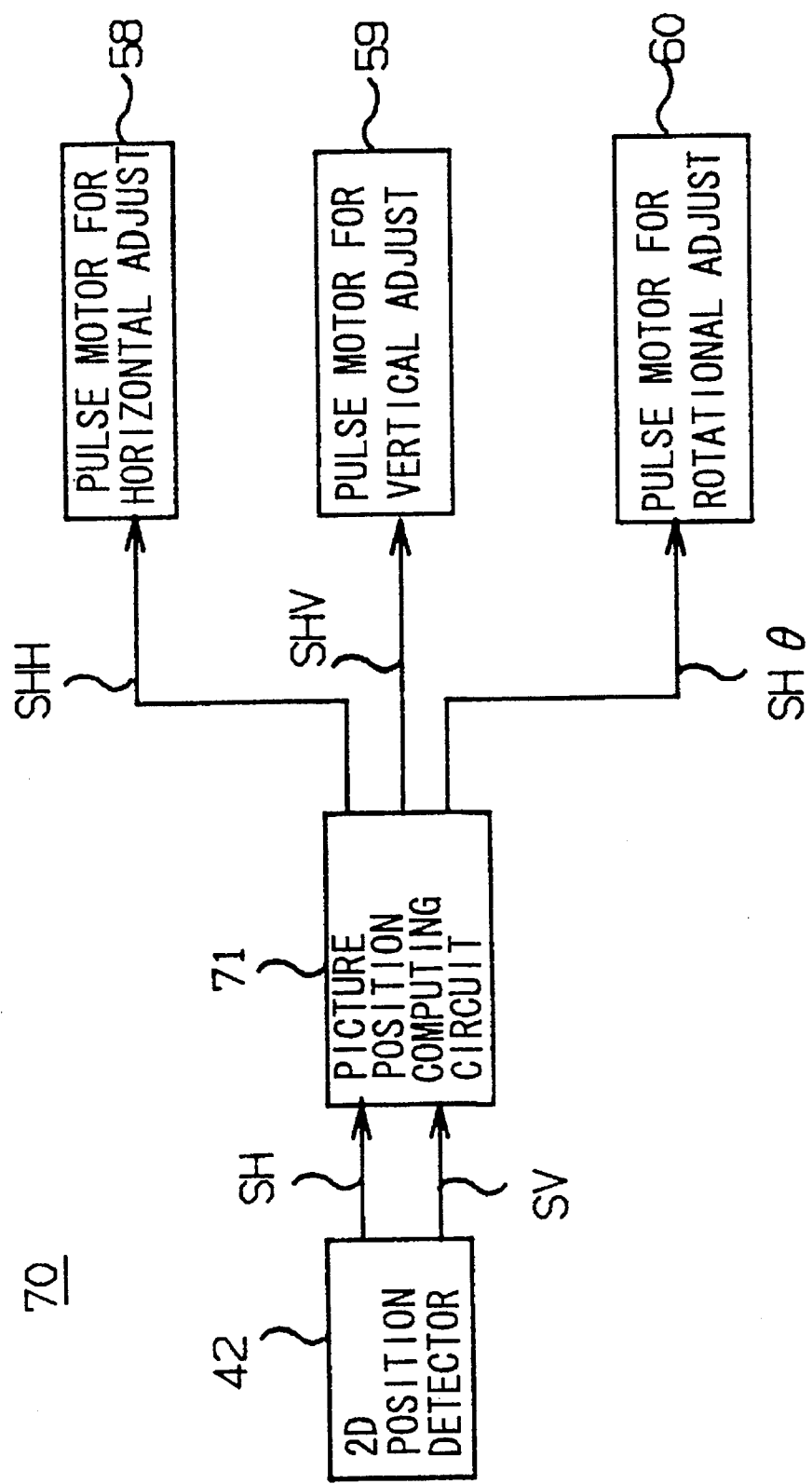
FIG. 10 is a block diagram showing the picture position correcting circuit.

In the case of this embodiment, as shown in FIG. 10, in the picture position correcting device 70, the pixel horizontal position detecting signal SH and the pixel vertical position detecting signal SV both detected by the two-dimensional position detector 42 are inputted to the picture position computing circuit 71. The picture position computing circuit 71 computes the horizontal discrepancy $\Delta H$, the vertical discrepancy $\Delta V$, and the rotational discrepancy $\Delta\theta$ from the equation (1), based on the horizontal position detecting signal SH and the vertical position detecting signal SV both inputted, and then generates the horizontal correcting signal SHH, the vertical correcting signal SHV, and the rotational correcting signal SHθ for correcting the discrepancies $\Delta H$, $\Delta V$ and $\Delta\theta$ respectively.

The horizontal correcting signal SHH, the vertical correcting signal SHV, and the rotational correcting signal SHθ are sent to the horizontal adjusting pulse motor 58, the vertical adjusting pulse motor 59, and the rotational adjusting pulse motor 60 respectively, so that the mirror light bulbs 2 (2R, 2G and 2B) can be finely displaced so as to adjust the picture positions, thereby correcting the discrepancy of the positions among colors automatically.

Because the discrepancy of the positions among colors due to alignment and thermal drift of the projector device 40 is thus capable of being corrected automatically, the initial alignment requires only the matching of the sizes of the pictures, and the previous position setting in the mechanism can be reduced, furthermore, the image quality can be considerably improved as a whole.

According to the above constitution, the effective reflecting lights of the mirror light bulbs 2 are focused into images at the position A right in front of the projection lens 11, and the effective reflection lights are partly turned and focused on the two-dimensional position detector 42 for detecting the vertical and horizontal positions of the formed images, and then, based on the detected information from the two-dimensional position detector 42, the mirror light bulbs 2 can be finely displaced in the vertical, horizontal, and rotational directions, so that the positions of the effective reflection lights from at least two mirror light bulbs 2 can be adjusted, therefore the discrepancy of the positions among colors can be effectively corrected and the image quality can be considerably improved.

(3) The projector device of the second embodiment

Figure 11:
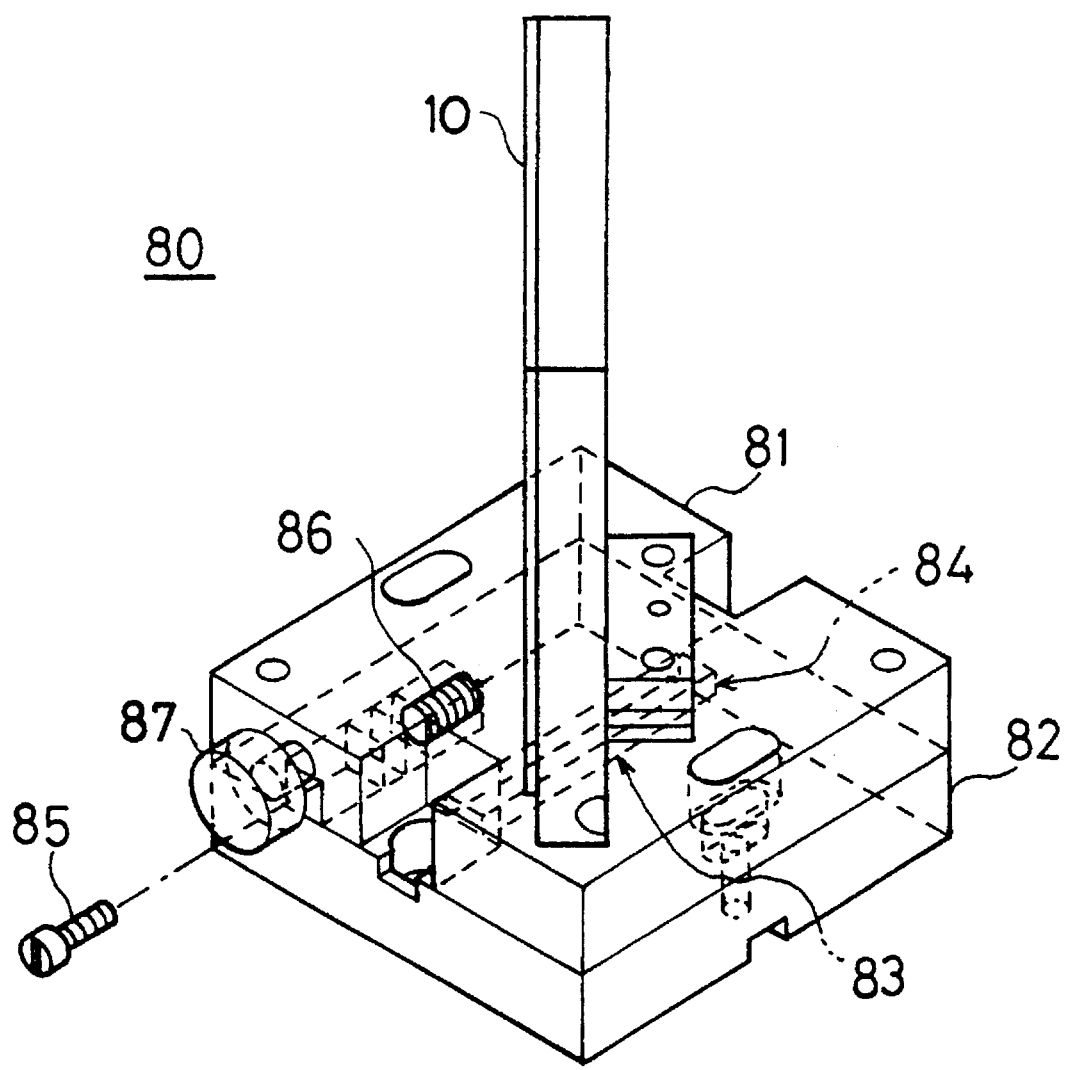
FIG. 11 is a schematic perspective view showing the mounting block for the synthesizing dichroic mirror.

In FIG. 11 which has the same numerical numbers as FIG. 1 on the corresponding parts, the mounting block 80 for the synthesizing dichroic mirror 10 (10R, 10G and 10B) is constituted integrally with a mirror holder 81. The mirror holder 81 is attached to a base 82, and is able to be adjusted in the optical axis direction by virtue of the operations of the sliding key 83 and the guide groove 84.

The mounting block 80 can be finely adjusted in the horizontal direction with respect to the optical axis of the relay lens 9, by virtue of the operations of the picture position adjusting screw 85 and the compression spring 86. The horizontal adjusting pulse motor 87 is arranged so as to allow it to mate with the picture position adjusting screw 85. Therefore, by driving the pulse motor 87, the synthesizing dichroic mirror 10 can be finely displaced and hence the picture can be adjusted in the horizontal direction.

In the case of this embodiment, the horizontal correcting signal SHH in the picture position correcting circuit 70 is supplied to the horizontal adjusting pulse motor 87 of the mounting block 80 for the synthesizing dichroic mirrors 10, instead of to the horizontal adjusting pulse motor 58 of the mounting block 50 for the mirror light bulb 2.

Thus, the mirror light bulb 2 is finely displaced in the vertical and rotational directions and the synthesizing dichroic mirror 10 is finely displaced in the horizontal direction, the picture position is adjusted, the discrepancy of the positions among the colors can be corrected automatically.

According to the above constitution, based on the detected information from the two-dimensional position detector 42, the mirror light bulb 2 is finely displaced in the vertical and rotational directions, and the synthesizing dichroic mirror 10 is finely displaced in the horizontal direction, so that the positions of the effective reflection lights from at least two mirror light bulbs 2 are adjusted, therefore the discrepancy of the positions among the colors can be effectively corrected and the image quality can be considerably improved.

(4) The other embodiments

In the embodiment mentioned above, the reflecting surface of the mirror deflection type light modulator is composed of 768×576 pieces of microscopic mirror elements which are arranged respectively according to the arrangement of the pixels of the image data. However, this invention is not limited to this, but may be variously selected. Furthermore, it is not only limited to the two-dimensional arrangement, but may arrange the microscopic mirror elements linearly and wherein the image may be formed by the scanning of the projection light, the effect similar to that of the above embodiment can be realized.

In the embodiment mentioned above, the red, green, and blue projection lights are respectively thrown on the mirror deflection type light modulators which are driven according to the red, green, and blue images respectively, and then the resulted effective reflection lights are synthesized and displayed as an enlarged image. However, this invention is not only limited to this, but may applicable to other devices. For example, it is applicable to a device wherein a single mirror deflection type light modulator is driven according to the red, green, and blue images in a sequential time-sharing manner and is synchronously illuminated by the red, green, and blue projection lights in a sequential time-sharing manner, and also is applicable to the projector device wherein the mirror deflection type light modulators which can project at least two colors of images by oneself are combined, and it is also able to realize the effect similar to that of the above embodiment.

According to this invention, the effective reflecting lights from the mirror deflection type light modulators are focused into images at the position A right in front of the projection lens, at the same time, the effective reflection lights are partly turned and focused on the two-dimensional position detector means for detecting the vertical and horizontal positions of the formed pictures, and then, based on the detected information from the two-dimensional position detector means, the mirror deflection type light modulators are finely displaced in the vertical and rotational directions and the synthesizing mirror means may be finely displaced in the direction of focal length, so that the positions of the effective reflection lights from at least two mirror deflection type light modulators may be adjusted, therefore the discrepancy of the positions among the colors of the projector device can be effectively corrected and the image quality of it can be considerably improved.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A projector device for displaying desired images on an image displaying surface, by projecting illuminating light on at least two mirror deflection type light modulators each having a plurality of microscopic mirror elements arranged in accordance with image data pixels, said at least two mirror deflection type light modulators being modulated by said image data of at least two colors respectively, and effective reflection lights from said at least two mirror deflection type light modulators which correspond to said respective image data being synthesized, said projector device comprising;

relay lens means for focusing said effective reflection lights of said at least two mirror deflection type light modulators into images at a focusing position in front of a projection lens having an aperture, the focused images being smaller than said aperture;

mirror means disposed in front of said focusing position for partly reflecting and turning said effective reflection light images;

two-dimensional position detecting means for detecting vertical and horizontal positions of the effective reflection light images turned by said mirror means;

adjusting means for finely displacing said at least two mirror deflection type light modulators in the vertical and horizontal directions; and control means for controlling said adjusting means in accordance with detected output from said two-dimensional position detecting means, so as to finely displace said at least two mirror deflection type light modulators thereby controlling the positions of said effective reflection light images of said at least two mirror deflection type light modulators.

2. A projector device for displaying desired images on an image displaying surface, by projecting illuminating light on at least two mirror deflection type light modulators each having a plurality of microscopic mirror elements arranged in accordance with image data pixels, said at least two mirror deflection type light modulators being modulated by said image data of at least two colors respectively, and effective reflection lights from said at least two mirror deflection type light modulators being synthesized in accordance with said image data, said projector device comprising:

relay lens means for focusing said effective reflection lights of said at least two mirror deflection type light modulators into images at a focusing position in front of a projection lens having an aperture, the focused images being smaller than said aperture;

synthesizing mirror means for selectively reflecting said focused light images to form a synthesized image;

mirror means disposed in front of said focusing position for partly reflecting and turning said synthesized image;

two-dimensional position detecting means for detecting vertical and horizontal positions of the synthesized image turned by said mirror means;

first adjusting means for finely displacing said at least two mirror deflection type light modulators in the vertical and horizontal directions;

second adjusting means for finely displacing said synthesizing mirror means; and control means for selectively controlling said first and second adjusting means in accordance with detected output from said two-dimensional position detecting means so as to finely displace said at least two mirror deflection type light modulators and/or said synthesizing mirror means, thereby controlling the positions of said effective reflection light images of said at least two mirror deflection type light modulators.

3. The projector device according to claim 1, wherein said adjusting means finely displaces said at least two mirror deflection type light modulators selectively in said vertical and horizontal directions, or in said vertical direction and rotational direction.

4. The projector device according to claim 2, wherein said first adjusting means finely displaces said at least two mirror deflection type light modulators selectively in said vertical and horizontal directions, or in said vertical direction and rotational direction.

* * * * *